United States Patent Office 3,365,530
Patented Jan. 23, 1968

3,365,530
PHOSPHONIC ACID ESTERS CONTAINING
URETHANE GROUPS
Ulrich Bahr, Günther Nischk, and Hans Holtschmidt,
Leverkusen, Germany, assignors to Farbenfabriken
Bayer Aktiengesellschaft, Leverkusen, Germany, a
German corporation
No Drawing. Filed Oct. 8, 1964, Ser. No. 402,604
Claims priority, application Germany, Oct. 10, 1963,
F 40,957
3 Claims. (Cl. 260—937)

ABSTRACT OF THE DISCLOSURE

Phosphonic acid esters containing urethane groups, particularly of the type

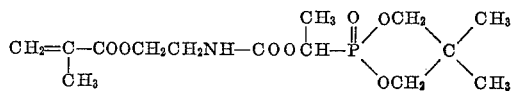

These compounds may be substituted with other alkyl or aryl radicals on the carbon atom alpha to the phosphorus group as well as with other lower alkyl radicals on the phosphorus atom. Furthermore, the methyl group on the carbon atom may be replaced with a hydrogen atom. These compounds may be incorporated into plastics to produce flame resistance.

---

This invention relates to phosphonic acid esters and more particularly to unsaturated phosphonic acid esters which contain urethane groups.

It has been proposed heretofore to prepare unsaturated phosphonic acid esters by reacting dialkyl esters of alpha-hydroxyalkyl phosphonic acids with acrylic or methacrylic acid chlorides in the presence of a base. Such a process is disclosed in U.S. Patent 2,934,555. These compounds can be polymerized or copolymerized with other acrylic esters to yield flame resistant plastics. The heretofore known dialkyl phosphonoalkyl acrylates are not always satisfactory for the preparation of flame retardant plastics, however, because they sometimes have unsatisfactory compatibility, particularly with urethane plastics, and are sometimes insufficiently stable to hydrolysis for good storage.

It is therefore an object of this invention to provide improved phosphonic acid esters particularly adapted to impart flame resistance to polyurethane plastics. Another object is to provide an improved process for the preparation of phosphonic acid esters which contain urethane groups. Another object of this invention is to provide an improved process for the production of acrylate and methacrylate esters which are suitable for incorporation into plastics to impart flame resistance thereto. A further object of this invention is to provide an additive which will impart flame resistance to polyurethane plastics which has improved compatibility with raw materials leading to the production of the polyurethane plastic and which has improved compatibility with the polyurethane itself. A still further object of this invention is to provide an additive adapted to impart flame resistance to polyurethane plastics, said additive having improved hydrolytic stability.

The foregoing objects and others which will become apparent from the following description are accomplished in accordance with this invention, generally speaking, by providing compounds having the formula

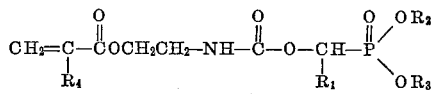

wherein $R_1$ is a hydrogen atom, alkyl or aryl radical such as methyl, ethyl, propyl, butyl, decyl, phenyl, chlorophenyl, diphenyl and the like. $R_2$ and $R_3$ may be the same or different and represent lower alkyl radicals such as methyl, ethyl, n-propyl, n-butyl, amyl and the like, and $R_4$ is a hydrogen atom or a methyl group. The invention also contemplates a process for the preparation of compositions having the foregoing formula wherein a phosphonic acid ester having the formula

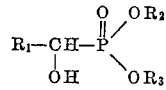

wherein $R_1$, $R_2$ and $R_3$ have the meaning set forth above is reacted with an isocyanate having the formula

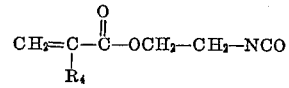

wherein $R_4$ has the meaning set forth above at a temperature of from about 20° C. to about 120° C. In carrying out the process of the invention it is preferred to use an inert organic solvent. It is preferred to use a catalyst and it is preferred to carry out the reaction in the presence of a polymerization inhibitor.

Any suitable phosphonic acid ester may be used

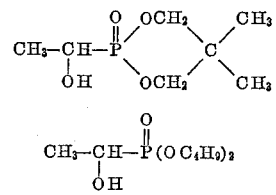

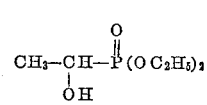

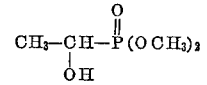

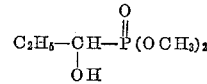

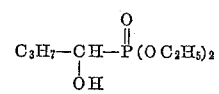

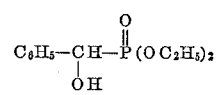

Any suitable isocyanate having the formula set forth above may be used including, for example, beta-isocyanatoethyl methacrylate and beta-isocyanatoethyl acrylate.

If the reaction is carried out in an inert organic solvent, as is preferred, any suitable solvent may be used such as hydrocarbons including benzene, toluene and the like or chlorinated hydrocarbons such as chloroform, methylene chloride, ortho-dichlorobenzene and the like or ethers such as diethyl ether, dioxane, tetrahydrofuran or the like or nitriles such as acetonitrile and the like. It is sometimes desirable as set forth above to employ a catalyst for the reaction between the isocyanato group and the hydroxyl radical. It is preferred to use a catalytic quantity of a tertiary amine such as triethylamine, N-methyl piperidine, endo-ethylene piperazine and the like. It is advantageous to use from about 0.01 to 2% by weight of the catalyst based on the total weight of the reactants. It is also preferred to use a small amount of a polymerization inhibitor preferably from about 0.005 to about 1% by weight based on the total weight of the reactants. Suitable polymerization inhibitors include, for example, hydroquinone, quinhydrone, quinone, phenthiazine and the like.

The reaction is carried out by simply mixing the components with one another, preferably in a mol ratio of approximately 1:1 and preferably in an inert organic solvent as set forth above. It is preferred to carry out the reaction at a temperature of from about 20° C. to about 100° C. and most preferably at from about 50° C. to about 100° C.

The course of the reaction can be followed by determining the isocyanate number. Some of the esters are colorless or pale colored oils while others are crystalline. They are generally sufficiently pure as initially obtained for further use.

The compounds of the invention are useful for imparting flame resistance to plastics including unsaturated polyesters and the like. They are particularly useful for imparting flame resistance to polyurethane plastics including rigid polyurethane foam materials because of their improved compatibility with raw materials and because they are more hydrolytically stable than similar phosphorous containing flame retardant additives which do not contain urethane linkages.

The invention is further illustrated by the following examples in which parts are by weight unless otherwise specified.

*Example 1*

About 291 g. of the phosphonic acid ester of the formula $$CH_3-CH-P(O)(OCH_2-C(CH_3)_2-CH_2O)$$
$$\phantom{CH_3-CH-}OH$$

are dissolved in about 1125 cc. of benzene. About 2.25 g. of quinhydrone are added as polymerization inhibitor and about 7.5 g. of endoethylene piperazine as catalyst. About 232.5 g. of beta-isocyanatoethyl methacrylate are then added dropwise and the mixture is stirred for about 45 hours at about 70° C. The conversion is then more than about 95%. The mixture is allowed to cool slightly, a small quantity of active carbon is added and stirring is continued for about 30 minutes at about 50° C. The solution is filtered and the filtrate is concentrated under reduced pressure to about 1 liter. On cooling, there are precipitated about 388 g. of the urethane of the formula $$CH_2=C(CH_3)-COOCH_2CH_2NH-COOCH-P(O)(OCH_2-C(CH_3)_2-CH_2O)$$

of melting point about 95° C. (about 75% of the theoretical). Calculated: 48.2% C, 6.9% H, 4.0% N, 8.9% P. Found: 47.7% C, 6.9% H, 4.1% N, 8.7% P.

By careful dilution of the mother liquor with petroleum ether, an additional quantity of less pure urethane can be recovered.

*Example 2*

About 77 g. of beta-isocyanatoethyl methacrylate are added dropwise at about 50 to about 60° C. to about 119 g. of the phosphonic acid ester $$CH_3-CH(OH)-P(O)(OC_4H_9)_2$$

which contains about 0.5 g. of quinhydrone as polymerization inhibitor and about 2.4 g. of endoethylene piperazine as catalyst. After stirring for about 10 hours at about 65° C., it is no longer possible to detect any isocyanate. The reaction product is a pale yellow, noncrystallizing oil, which is readily soluble in methanol and readily polymerizes on heating with a little azodiisobutyronitrile. The product has a P-content of about 7.41% (calculated 7.87%).

*Example 3*

About 91 g. of the phosphonic acid ester $$CH_3-CH(OH)-P(O)(OC_2H_5)_2$$

which contain about 0.5 g. of quinhydrone as polymerization inhibitor and about 1.5 g. of endoethylene piperazine as catalyst are treated with about 77 g. of beta-isocyanatoethyl methacrylate at about 60° C. over a period of about one hour. After stirring for about six hours at about 70° C. the reaction is complete. A small quantity of active carbon is added, the mixture is stirred for about 15 minutes at about 50° C. and filtered. The product obtained in practically quantitative yield is a pale-colored oil. The P-content is 8.7% (calculated 9.2%).

*Example 4*

100 g. of a polyester having an hydroxyl content of 11.8%, which has been prepared from 1 mol of adipic acid, 2 mols of phthalic anhydride, 1 mol of oleic acid and 5 mols of trimethylol propane, are mixed with 20 g. of the urethane group-containing phosphonic acid ester prepared as described in Example 2, and stirred with the aid of a high-speed stirrer with an activator mixture of 2 g. of dimethylbenzylamine and 5 g. of a 54% aqueous solution of the sodium salt of castor oil sulfate. The mixture is reacted with 123 g. of a toluylene diisocyanate which has been modified with a copolymer prepared from 2,4-toluylene diisocyanate and diphenylmethane diisocyanate. A foam material of good flame-resistance is obtained.

*Example 5*

30 g. of styrene, 10 g. of the urethane group-containing phosphonic acid ester prepared as described in Example 3, 0.02 g. of hydroquinone and 0.25 g. of 2-hydroxy-4-methoxybenzophenone are added to 60 g. of an unsaturated polyester prepared in usual manner from 44 g. of fumaric acid, 234 g. of 1,4,5,6,7,7-hexachlorobicyclo - (2.2.1) - heptene - (5) - dicarboxylic acid - (2,3) - anhydride and 68 g. of ethylene glycol. Upon the addition of 4% by weight of benzoylperoxide paste (50% in dimethyl phthalate) hardening follows at 100° C. There is obtained a clear polymer which, after ignition with a flame, extinguishes.

It is to be understood that the foregoing working examples are given for the purpose of illustration and that any other suitable phosphonic acid ester, isocyanate, catalyst, polymerization inhibitor, solvent or the like can be used provided the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A compound having the formula $$CH_2=C(CH_3)-C(O)OCH_2CH_2-NH-C(O)-O-CH(R_1)-P(O)(OR_2)(OR_3)$$

wherein $R_1$ is selected from the group consisting of alkyl, aryl and hydrogen, $R_2$ and $R_3$ are lower alkyl radicals or wherein $R_2$ and $R_3$ when taken together represent $$-CH_2-C(CH_3)_2-CH_2-$$

and $R_4$ is a member selected from the group consisting of a hydrogen atom and a methyl group.
2. The compound of claim 1 wherein $R_1$ is methyl.
3. The compound having the formula
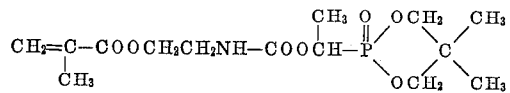
References Cited
UNITED STATES PATENTS
2,806,838  9/1957  Melamed _____ 260—482
CHARLES B. PARKER, *Primary Examiner.*
B. BILLIAN, *Assistant Examiner.*